United States Patent
Yamaguchi

(10) Patent No.: US 12,455,389 B2
(45) Date of Patent: Oct. 28, 2025

(54) RADIATION IMAGING APPARATUS

(71) Applicant: CANON KABUSHIKI KAISHA, Tokyo (JP)

(72) Inventor: Kenji Yamaguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 210 days.

(21) Appl. No.: 18/475,093

(22) Filed: Sep. 26, 2023

(65) Prior Publication Data

US 2024/0111063 A1  Apr. 4, 2024

(30) Foreign Application Priority Data

Sep. 29, 2022 (JP) ................................ 2022-156193

(51) Int. Cl.
| | |
|---|---|
| *G01T 1/00* | (2006.01) |
| *A61B 6/00* | (2024.01) |
| *G01T 1/17* | (2006.01) |
| *H04N 23/30* | (2023.01) |
| *H04N 23/667* | (2023.01) |

(52) U.S. Cl.
CPC ............... *G01T 1/17* (2013.01); *H04N 23/30* (2023.01); *H04N 23/667* (2023.01)

(58) Field of Classification Search
None
See application file for complete search history.

(56) References Cited

U.S. PATENT DOCUMENTS

| | | | | |
|---|---|---|---|---|
| 2014/0205066 | A1* | 7/2014 | Kitagawa | H04N 23/30 378/62 |
| 2017/0272670 | A1* | 9/2017 | Tezuka | H04N 25/63 |
| 2019/0045612 | A1* | 2/2019 | Tamura | H05G 1/44 |
| 2019/0290237 | A1* | 9/2019 | Kuwata | A61B 6/566 |
| 2020/0187891 | A1* | 6/2020 | Gotoh | A61B 6/52 |

FOREIGN PATENT DOCUMENTS

JP         2019171199 A      10/2019

* cited by examiner

*Primary Examiner* — Hoon K Song
(74) *Attorney, Agent, or Firm* — Canon U.S.A., Inc. IP Division

(57) ABSTRACT

A radiation imaging apparatus includes a radiation detection unit, a communication unit configured to receive a setting including an imaging mode when a radiographic image is acquired by the radiation detection unit from a control apparatus, a storage unit configured to store correction data for correcting the radiographic image, and a control unit configured to control an operation of at least one of the radiation detection unit, the communication unit, and the storage unit, wherein, when imaging starts in a normal imaging state where communication between the communication unit and the control apparatus is normal, the control unit acquires first correction data by a first preparation operation of driving the radiation detection unit in a non-irradiation state in the imaging mode, and when imaging starts in an emergency imaging state where the communication state is not normal, the control unit acquires second correction data usable in an abnormal imaging mode.

7 Claims, 5 Drawing Sheets

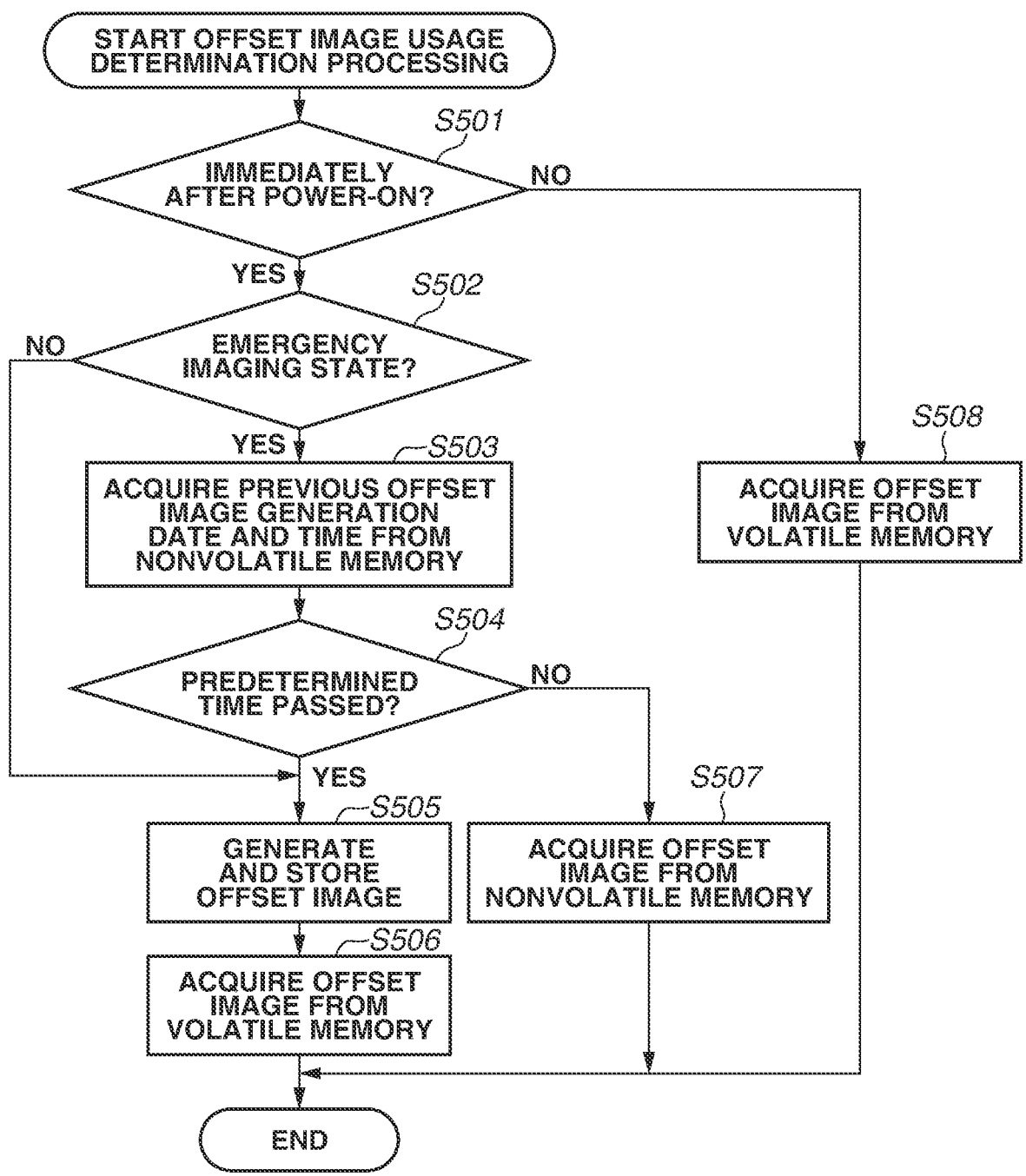

RADIATION IMAGING APPARATUS

BACKGROUND OF THE DISCLOSURE

Field of the Disclosure

The present disclosure relates to a radiation imaging apparatus that acquires an image based on radiation transmitted through an object.

Description of the Related Art

Conventionally, radiation imaging apparatuses and radiation imaging systems have been produced that irradiate an object with radiation from a radiation generation apparatus, digitize intensity distribution of the radiation transmitted through the object, and perform image processing on a digitized radiographic image to acquire a clear radiographic image.

A radiographic image generated by a radiation imaging apparatus includes not only a component corresponding to incident radiation but also a noise component corresponding to a dark charge generated regardless of radiation irradiation. In order to remove the component corresponding to the dark charge, a correction method is known in which an image (an offset image) acquired in a state in which the radiation imaging apparatus is not irradiated with radiation is subtracted from a radiographic image. A generation amount of the dark charge depends on an internal temperature of the radiation imaging apparatus, and for this reason, if there is a difference between the temperature distribution inside the radiation imaging apparatus when an offset image is acquired and the temperature distribution inside the radiation imaging apparatus when a radiographic image is acquired, an offset component cannot be removed correctly in some cases.

According to Japanese Patent Application Laid-Open No. 2019-171199, a method is discussed for reducing a waiting time until imaging can be performed by preparing imaging with a predetermined imaging mode prioritized, and sequentially permitting imaging from an imaging mode in which imaging preparation is completed.

According to the method discussed in Japanese Patent Application Laid-Open No. 2019-171199, it is necessary to acquire image data captured after turning on a power supply to the radiation imaging apparatus as offset correction data. Thus, it may take some time before imaging can be performed.

SUMMARY OF THE INVENTION

The present disclosure is directed to the provision of a radiation imaging apparatus that requires a short waiting time before imaging can be performed even in a case where a control apparatus is down after a power supply to the radiation imaging apparatus is turned on.

According to an aspect of the present disclosure, a radiation imaging apparatus includes a radiation detection unit, a communication unit configured to receive a setting including an imaging mode at a time of acquiring a radiographic image by the radiation detection unit from a control apparatus, a storage unit configured to store correction data for correcting the radiographic image, and a control unit configured to control an operation of at least one of the radiation detection unit, the communication unit, and the storage unit, wherein, in a case where imaging is started in a normal imaging state in which communication between the communication unit and the control apparatus is in a normal state, the control unit acquires first correction data by a first preparation operation of driving the radiation detection unit in a non-irradiation state in the imaging mode received by the communication unit, and in a case where imaging is started in an emergency imaging state in which the communication state is not in the normal state, the control unit acquires second correction data that is usable in an abnormal imaging mode set in advance from the storage unit.

Further features of the present disclosure will become apparent from the following description of exemplary embodiments with reference to the attached drawings.

BRIEF DESCRIPTION OF THE DRAWINGS

FIG. 5 is a flowchart illustrating offset image usage determination processing in the radiation imaging apparatus according to the present disclosure.

DESCRIPTION OF THE EMBODIMENTS

Exemplary embodiments of the present disclosure will be described with reference to the attached drawings.

Figure 1:
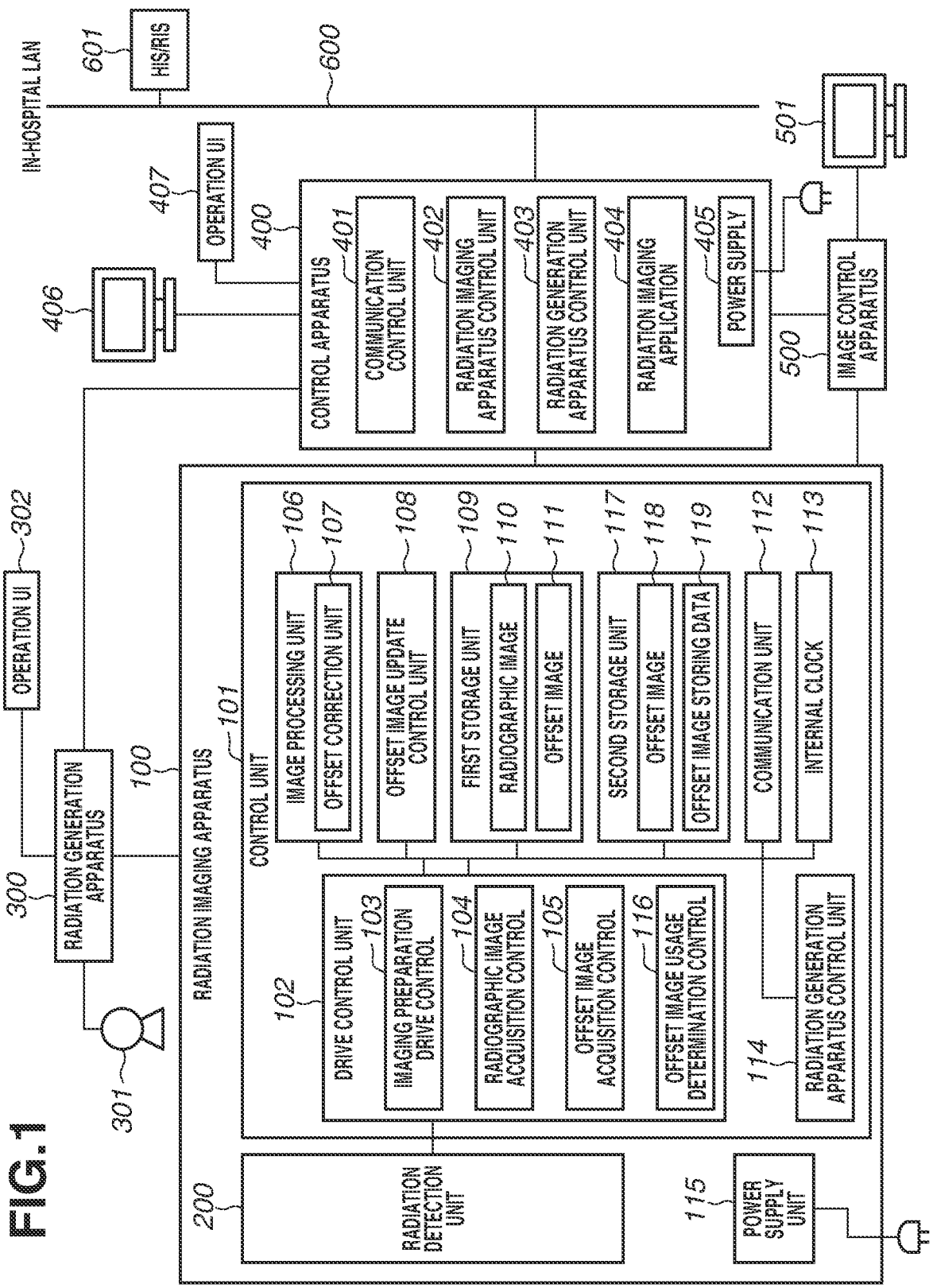
FIG. 1 illustrates a configuration example of a radiation imaging system.

A first exemplary embodiment is to be described. FIG. 1 illustrates a configuration example of a radiation imaging system. The present system includes a radiation imaging apparatus 100 that includes a radiation detection unit 200, a radiation source 301 that emits radiation, and a radiation generation apparatus 300 that controls the radiation source 301. The present system further includes a control apparatus 400 including a radiation imaging application 404 that can control the radiation imaging apparatus 100 and the radiation generation apparatus 300, collect and display a captured image from the radiation imaging apparatus 100, accept an imaging order, and register imaging information. The radiation imaging system includes an image control apparatus 500 that outputs the captured image output from the radiation imaging apparatus 100 to the control apparatus 400 and thus is configured of the above-described components. The control apparatus 400 is connected to an in-hospital network 600 such as a local area network (LAN). The in-hospital network 600 is connected to a radiology information system (RIS) 601 or a hospital information system (HIS). The control apparatus 400 and the RIS 601 can communicate with each other and exchange an imaging order for capturing radiographic images, imaging information including, for example, patient information, and captured image data itself.

The radiation imaging apparatus 100 includes the radiation detection unit 200 that detects radiation and generates image data, a control unit 101 that controls imaging and communication operations, and a power supply unit 115.

The control unit 101 includes a drive control unit 102 that controls driving of the radiation detection unit 200 and acquisition of a radiographic image and an offset image, and an image processing unit 106 provided with an offset correction unit 107 that performs image processing on an image acquired from the radiation detection unit 200. The control unit 101 further includes an offset image update control unit 108 that controls timing of updating an offset image and a first storage unit 109 that stores the acquired image data in a volatile memory. The control unit 101 further includes a second storage unit 117 that stores the acquired offset image and offset image storing data (offset image generation date and time information, temperature information at the time of offset image generation, etc.) 119 in a non-volatile memory. The control unit 101 further includes a communication unit 112 that controls communication with the control apparatus 400 and with the radiation generation apparatus 300, and an internal clock 113 for acquiring imaging time, elapsed time, and the like. The communication unit 112 also serves as a reception unit that receives a setting including an imaging mode at the time of capturing a radiographic image from the control apparatus 400. The control unit 101 further includes a radiation generation apparatus control unit 114 that controls irradiation timing based on a radiation irradiation signal of the radiation generation apparatus 300. The control unit 101 reads, for example, a program or the like stored in the first storage unit 109 to control the entire radiation imaging apparatus 100 based on the program. Alternatively, the radiation imaging apparatus 100 may be controlled by a control signal generating circuit such as an application specific integrated circuit (ASIC), or control of the entire radiation imaging apparatus 100 may be realized by both the program and the control circuit.

The radiation generation apparatus 300 includes an operation user interface (UI) 302 for operating the radiation generation apparatus 300. The operation UI 302 is used to perform a setting of a radiation irradiation condition and radiation irradiation. The radiation generation apparatus 300 and the radiation imaging apparatus 100 can exchange information therebetween via a dedicated signal line. The radiation generation apparatus 300 and the radiation imaging apparatus 100 exchange synchronization signals for notification of start and completion of radiation irradiation, notification of timing at which radiation irradiation can be performed, and the like.

The control apparatus 400 includes a radiation imaging apparatus control unit 402 that controls timing and a condition of image acquisition of the radiation imaging apparatus 100, and a radiation generation apparatus control unit 403 that controls the radiation irradiation condition and the like of the radiation generation apparatus 300. The control apparatus 400 further includes a communication control unit 401 that controls communication between the radiation imaging apparatus 100, the radiation generation apparatus 300, and the in-hospital LAN, the above-described radiation imaging application 404, and a display unit 406 for displaying a captured image and imaging information. The control apparatus 400 further includes an operation UI (a keyboard, a mouse, etc.) 407 for operating the radiation imaging application 404, and a power supply 405. Information can be exchanged between the control apparatus 400 and the radiation imaging apparatus 100 and between the control apparatus 400 and the radiation generation apparatus 300 by means of cable connection communication using a standard such as Recommended Standard (RS) 232C, Universal Serial Bus (USB), and Ethernet, a dedicated signal line, wireless communication, and the like. The control apparatus 400 and the radiation imaging apparatus 100 perform control communication of, for example, image data, an image acquisition condition setting, and apparatus state acquisition therebetween. The control apparatus 400 and the radiation generation apparatus 300 perform control communication of, for example, the setting of the radiation irradiation condition, apparatus state acquisition, and actual irradiation information therebetween.

The image control apparatus 500 performs image processing on an image transferred from the radiation imaging apparatus 100 and transfers the image to the control apparatus 400. The image control apparatus 500 includes a display unit 501 for displaying an image output from the radiation imaging apparatus 100 in a case where the control apparatus 400 is down.

Figure 2:
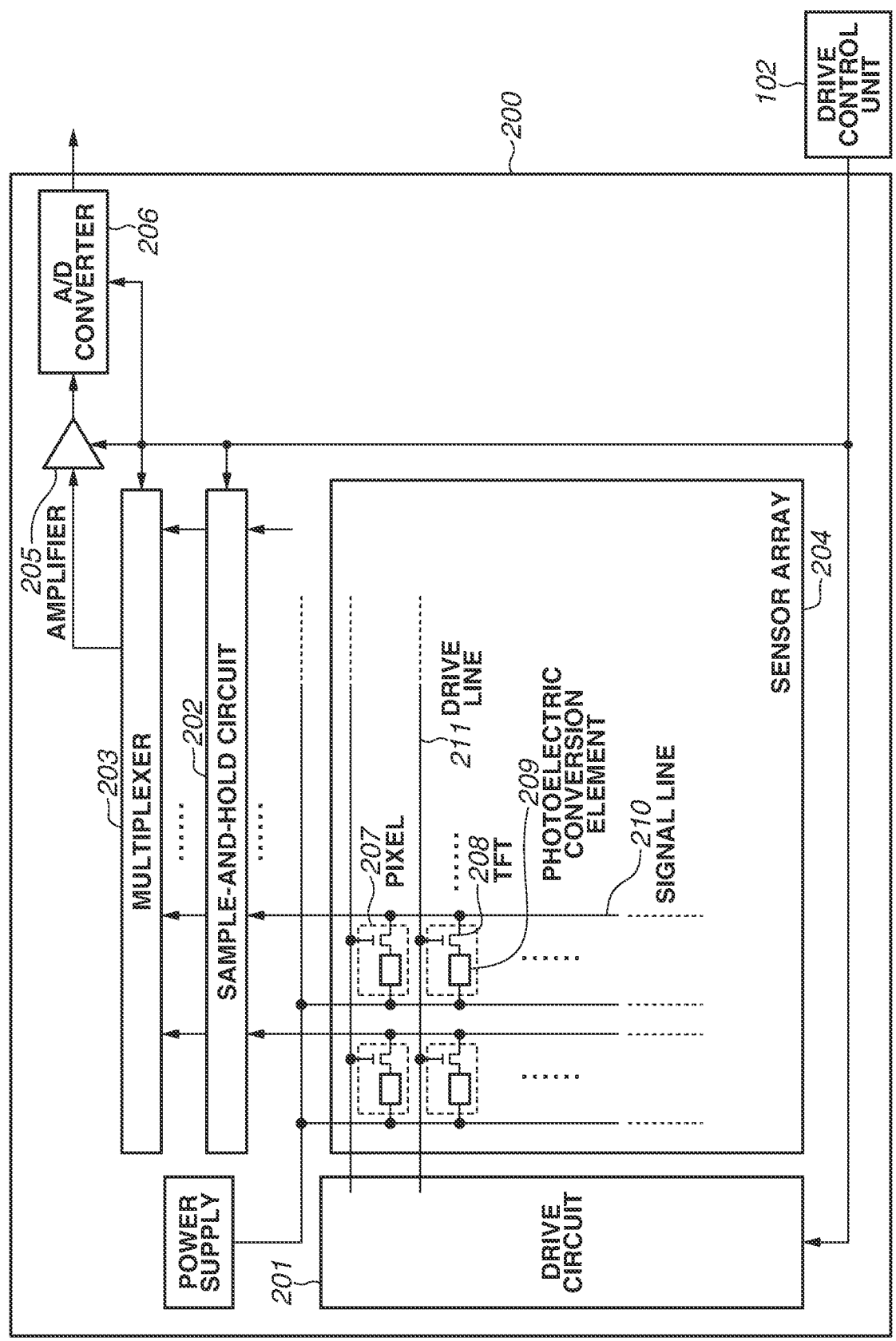
FIG. 2 illustrates a configuration example of a radiation detection unit in a radiation imaging apparatus.

FIG. 2 illustrates an example of a configuration of the radiation detection unit 200. The radiation detection unit 200 includes a sensor array 204 including a plurality of pixels arranged in a two-dimensional array to form a plurality of rows and columns. Each pixel 207 on the sensor array 204 includes, for example, a switch element 208 such as a thin-film transistor (TFT) and a photoelectric conversion element 209, and is formed of, for example, a fluorescent member provided thereon. In this case, radiation incident on the radiation detection unit 200 is converted into visible light by the fluorescent member, the visible light converted from the radiation enters the photoelectric conversion element 209 of each pixel 207, and each photoelectric conversion element 209 generates a charge corresponding to the visible light. According to the present exemplary embodiment, a configuration is described in which the above-described fluorescent member and photoelectric conversion element form a conversion element that converts incident radiation into a charge. However, for example, a direct conversion type conversion element that directly converts incident radiation into a charge may be configured without the fluorescent member. The direct conversion type conversion element can accumulate and read charges by switching the switching element 208 such as the TFT between ON and OFF and acquire a radiographic image.

In a case where a drive circuit 201 applies an ON voltage of the switching element 208 such as the TFT to a drive line 211 in the pixel 207 on a certain row on the two-dimensional sensor array 204 of the radiation detection unit 200, the switching element 208 such as the TFT of each pixel 207 on the row is turned ON, and the charge is stored through each signal line 210 in a sample-and-hold circuit 202.

Subsequently, a stored pixel output charge is sequentially read out via a multiplexer 203, amplified by an amplifier 205, and then converted into digital image data by an analog-to-digital (A/D) converter 206. In the row in which reading of the charge is completed, the drive circuit 201 applies an OFF voltage of the TFT 208 to the drive line 211, so that each pixel on the row returns to charge accumulation. In this way, the drive circuit 201 sequentially drives and scans each row on the sensor array 204, and finally all pixel output charges are converted into digital values. Accordingly, radiographic image data can be read out. The drive control unit 102 controls these driving and reading operations in the radiation detection unit 200. The image data converted into digital value is stored in the first storage unit 109 and the second storage unit 117 in FIG. 1.

The drive control unit 102 is configured to be able to switch and control which of imaging preparation drive control 103, radiographic image acquisition control 104, offset image acquisition control 105, and offset image usage determination control 116 to operate. The imaging preparation drive control 103 periodically reads out a charge and resets a dark charge accumulated in each pixel while applying a voltage similar to that in imaging to the radiation detection unit 200. The charge read out at this time may not be treated as image data and not be stored in the first storage unit 109 or the second storage unit 117. The radiographic image acquisition control 104 performs radiation irradiation during accumulation of each pixel while performing driving similar to that in the imaging preparation drive control 103. The radiographic image acquisition control 104 reads out the image data and stores the read image data in the first storage unit 109 as a radiographic image 110.

A moving image can be captured by continuously performing the radiographic image acquisition control 104. The offset image acquisition control 105 stores the image data read out in a state where no radiation is radiated as an offset image 111 in the first storage unit 109 while performing driving similar to that in the imaging preparation drive control 103. An offset image 118 similar to the offset image 111 is also stored in the second storage unit 117. An offset image used at the time of imaging is acquired from the first storage unit 109 or the second storage unit 117 by the offset image usage determination control 116.

The radiographic image 110 is subjected to offset correction processing by the offset correction unit 107 of the image processing unit 106 using the offset image 111 in the first storage unit 109 or the offset image 118 in the second storage unit 117 that are acquired in advance during non-imaging time. Subsequently, the radiographic image 110 is transferred to the image control apparatus 500 via the communication unit 112. Although only offset correction processing is described, correction processing such as correction of a defective pixel and gain correction for correcting gain variation of the amplifier 205 in the radiation detection unit 200 may be performed. The above-described correction processing is not limited to execution in the radiation imaging apparatus 100. For example, the acquired radiographic image 110 and offset image 111 may be transferred to the image control apparatus 500 without being corrected, and correction processing may be performed in the image control apparatus 500. For the offset image used in the offset correction processing, for example, an image acquired by performing noise component reduction processing or the like by averaging a plurality of acquired offset images may be used.

Figure 3:
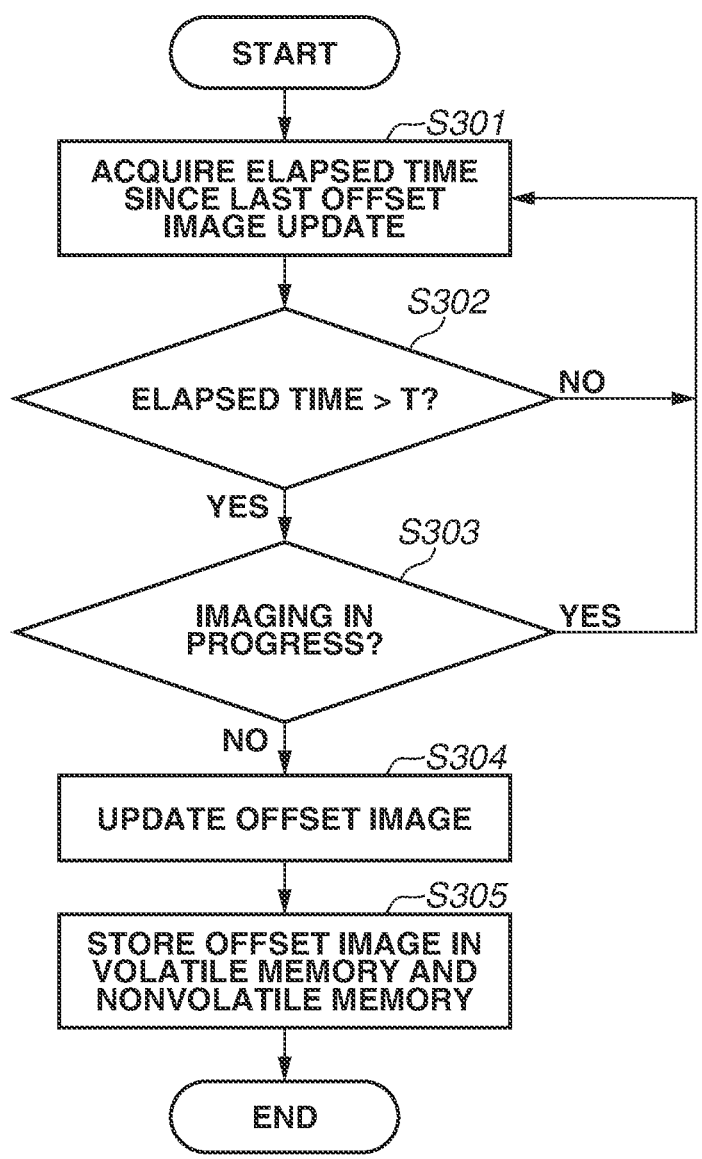
FIG. 3 is a flowchart for updating and storing an offset image as correction data in an exemplary embodiment of the radiation imaging apparatus according to the present disclosure.

FIG. 3 is a flowchart illustrating updating and storing an offset image according to the present exemplary embodiment.

The offset image update control unit 108 updates the offset image in following steps.

In step S301, the offset image update control unit 108 uses the internal clock 113 to acquire an elapsed time since last offset image update. In a case where the offset image has never been updated, the elapsed time is set to a maximum value.

In step S302, in a case where the elapsed time is greater than a predetermined time T (YES in step S302), the processing proceeds to step S303, and in a case where the elapsed time is less than the time T (NO in step S302), the processing returns to step S301. As an example, the time T is five minutes.

In step S303, the offset image update control unit 108 checks whether fluoroscopy or imaging is in progress. In a case where fluoroscopy or imaging is not in progress (NO in step S303), the processing proceeds to step S304, and in a case where fluoroscopy or imaging is in progress (YES in step S303), the processing returns to step S301. In a case where fluoroscopy or imaging is not in progress, the imaging preparation drive control 103 is performed.

In step S304, the offset image update control unit 108 switches from the imaging preparation drive control 103 to the offset image acquisition control 105 to update the offset image. In a normal imaging state, the offset image update control unit 108 sequentially updates all of the offset images for a fluoroscopy mode and an imaging mode that can be set in the radiation imaging apparatus 100. In an emergency imaging state, only a specific fluoroscopy mode can be operated, but the offset image update control unit 108 updates all of the offset images for the fluoroscopy mode and the imaging mode that can be set. A continuous fluoroscopy mode or a pulse fluoroscopy mode can be set as the specific fluoroscopy mode. After the offset image update is completed, the offset image update control unit 108 sets the elapsed time to zero and advances the processing to step S305.

In step S305, the offset image update control unit 108 stores the offset image in the specific fluoroscopy mode of which update is completed in step S304 in the first storage unit 109 and the second storage unit 117 in FIG. 1.

Figure 4:
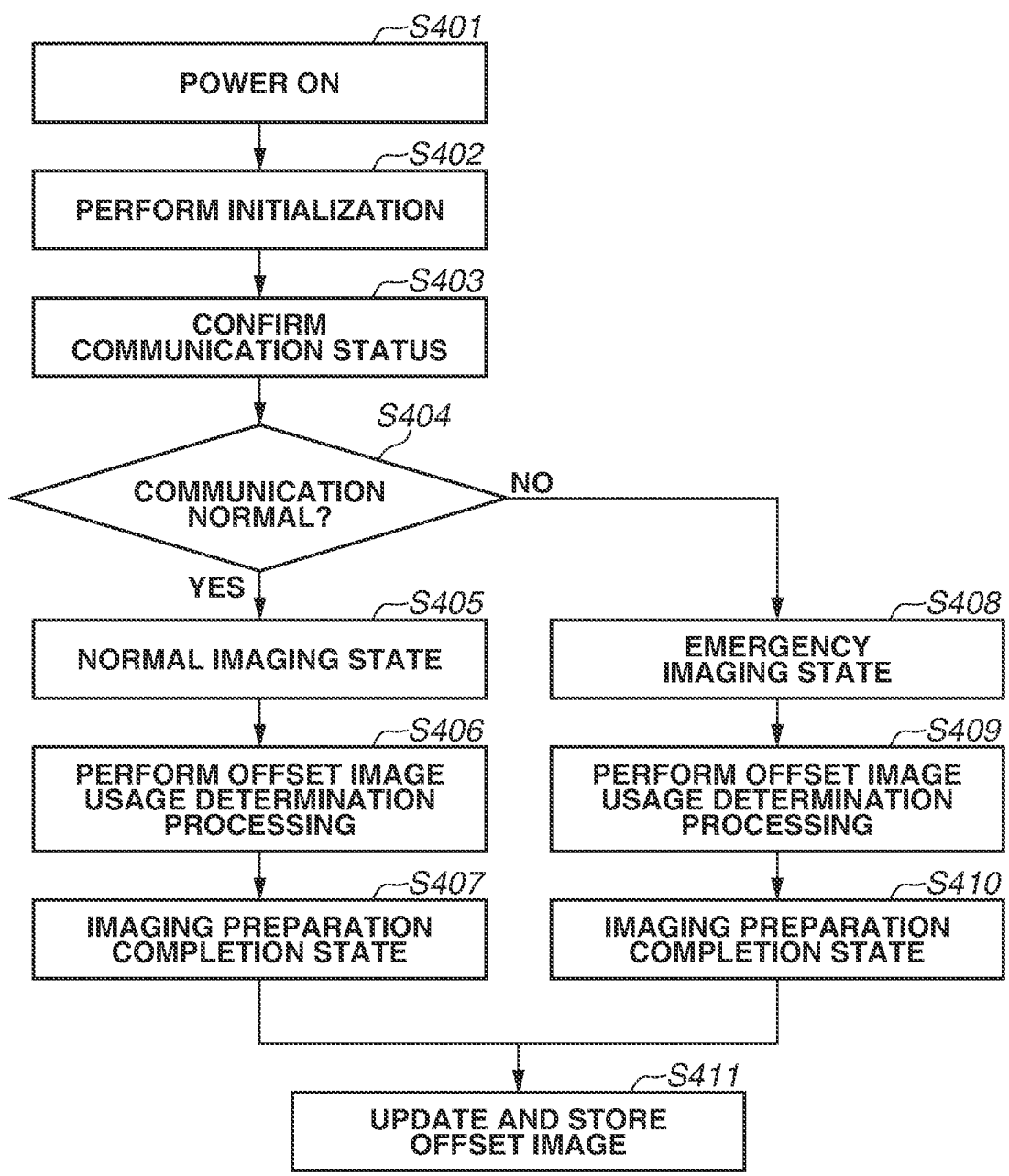
FIG. 4 is a flowchart illustrating offset image acquisition in response to switching between normal imaging and emergency imaging in the radiation imaging apparatus according to the present disclosure.

FIG. 4 is a flowchart illustrating offset image acquisition in response to switching between normal imaging and emergency imaging in the radiation imaging apparatus 100.

In step S401, the radiation imaging apparatus 100 is powered on.

In step S402, a program stored in the first storage unit 109 is read, and control of the radiation imaging apparatus 100 is started. Setting information, gain correction data, and defect correction data of the radiation imaging apparatus 100 stored in the first storage unit 109 are read out, and then the processing proceeds to step S403.

In step S403, a communication status with the control apparatus 400 is confirmed. As a confirmation method, a command is periodically (for example, at one second intervals) transmitted from the control apparatus 400, and in a case where the command is received by the communication unit 112, it is determined that communication is normal. In a case where the command is not received by the communication unit 112 for a certain period of time (for example, about three seconds), it is determined that communication is abnormal.

In step S404, in a case where the communication is normal as the result in step S403 (YES in step S404), the processing proceeds to step S405 for the normal imaging state, and in a case where the communication is abnormal (NO in step S404), the processing proceeds to step S408 for the emergency imaging state.

In the normal imaging state in step S405, the control apparatus 400 operates normally. Thus, information including settings of the fluoroscopy mode and the imaging mode (a radiation detection unit gain, an image size, binning, a frame rate, etc.), which is information related to an imaging instruction, is received from the control apparatus 400, and various settings are performed. In step S406, immediately after the power is turned on, a preparation operation for driving the radiation detection unit 200 in a non-irradiation state is performed to generate the offset image based on the received imaging mode by the offset image usage determination control 116. The offset image generated in step S406 is stored in the first storage unit 109 and the second storage unit 117, and then the processing proceeds to step S407.

In an imaging preparation completion state in step S407, for example, in a case where a fluoroscopy switch is pressed on the operation UI 302 of the radiation generation apparatus 300, the radiographic image acquisition control 104 performs driving in the fluoroscopy mode, and imaging is started. The radiation generation apparatus control unit 114 outputs a radiation irradiation timing signal to the radiation generation apparatus 300. The acquired radiographic image is transferred to the image control apparatus 500. The image transferred to the image control apparatus 500 is subjected to image processing, then the radiographic image is transferred to the control apparatus 400, and the fluoroscopic image is displayed on the display unit 406. In a case where an imaging switch is pressed on the operation UI 302, the radiographic image acquisition control 104 performs driving in the imaging mode, imaging is started, and the captured image is displayed on the display unit 406 in a similar manner.

In the emergency imaging state in step S408, the settings of the fluoroscopy mode and the imaging mode are not performed from the control apparatus 400, so that the operation is performed in the specific fluoroscopy mode, which is an abnormal imaging mode set in advance. In step S409, immediately after the power is turned on, the offset image 118 stored in the second storage unit 117 is acquired by the offset image usage determination control 116, and the processing proceeds to step S410. The offset image 118 is an offset image that can be used in the abnormal imaging mode. The offset image 118 is correction data acquired in advance by performing a preparation operation for driving the radiation detection unit 200 in the non-irradiation state in the operating state of the abnormal imaging mode and stored in the second storage unit 117.

In the imaging preparation completion state in step S410, for example, the specific fluoroscopy mode has high sensitivity, a maximum image size, and a frame rate of 15 fps. In a case where the fluoroscopy switch is pressed on the operation UI 302 of the radiation generation apparatus 300, the radiographic image acquisition control 104 performs driving in the specific fluoroscopy mode, and imaging is started. The radiation generation apparatus control unit 114 outputs the radiation irradiation timing signal to the radiation generation apparatus 300. The acquired radiographic image is transferred to the image control apparatus 500. The image transferred to the image control apparatus 500 is subjected to image processing, and then the fluoroscopic image is displayed on the display unit 501. The radiation generation apparatus control unit 114 adds a fact that the radiation imaging apparatus 100 is in the emergency imaging state to header information of the radiographic image to be transferred. The image control apparatus 500 may determine whether to display the fluoroscopic image on the display unit 501 and whether to transfer the radiographic image to the control apparatus 400 based on the header information.

In step S411, as illustrated in FIG. 3, the offset image read out in the state where no radiation is radiated is updated and stored, and the radiation imaging apparatus 100 waits until an irradiation switch is pressed on the operation UI 302 of the radiation generation apparatus 300.

The communication state is confirmed after completion of fluoroscopy and imaging in the normal imaging state and the emergency imaging state. In a case where the communication state is changed, the communication state is shifted to the normal imaging state or the emergency imaging state. The communication state may be confirmed during fluoroscopy and imaging. In a case where the communication state is changed, fluoroscopy and imaging may be interrupted, and the communication state may be shifted to the normal imaging state or the emergency imaging state.

By executing the processing in the above-described steps, in a case where the normal imaging state is changed to the emergency imaging state due to communication abnormality with the control apparatus 400 immediately after the power is turned on, fluoroscopy can be performed immediately using the offset image 118 stored in the second storage unit 117.

FIG. 5 is a flowchart illustrating offset image usage determination in the radiation imaging apparatus 100.

The offset image usage determination control 116 acquires the offset image in following steps.

In step S501, in a case where it is immediately after the power-on of the radiation imaging apparatus 100 (YES in step S501), the processing proceeds to step S502, and in a case where it is not immediately after the power-on (NO in step S501), the processing proceeds to step S508.

In step S502, in a case of the emergency imaging state as illustrated in FIG. 4 (YES in step S502), the processing proceeds to step S503, and in a case of the normal imaging state (NO in step S502), the processing proceeds to step S505.

In step S503, the offset image usage determination control 116 acquires previous offset image generation date and time stored in the second storage unit 117, and the processing proceeds to step S504.

In step S504, in a case where the internal clock 113 indicates that a predetermined time (for example, about one hour) has passed since the previous offset image generation date and time in step S503 (YES in step S504), the processing proceeds to step S505, and in a case where the predetermined time has not passed since the previous offset image generation date and time (NO in step S504), the processing proceeds to step S507.

In step S505, in order to avoid using an offset image that cannot correctly remove an offset component, the offset image 111 for the specific fluoroscopy mode is generated. The offset image generated in step S505 is updated and stored in the first storage unit 109 and the second storage unit 117, and then the processing proceeds to step S506.

In step S506, the offset image 111 stored in the first storage unit 109 is acquired. The offset image 111 in step S506 may be acquired from the second storage unit 117.

In step S507, the offset image 118 stored in the second storage unit 117 is acquired.

In step S508, the offset image 111 stored in the second storage unit 117 is acquired.

As described above, even if the control apparatus 400 is down immediately after the power is turned on, fluoroscopy can be performed immediately in the emergency imaging state using the offset image 118 stored in the second storage unit 117.

The temperature information at the time of offset image generation may be acquired from the second storage unit 117. In this case, in a case where a predetermined temperature change (for example, a change of about three degrees) occurs by the offset image usage determination control 116, the offset image 111 may be generated, and updated and stored in the first storage unit 109 and the second storage unit 117.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-156193, filed Sep. 29, 2022, which is hereby incorporated by reference herein in its entirety.

What is claimed is:

1. A radiation imaging apparatus comprising:
   a radiation detection unit;
   a communication unit configured to receive a setting including an imaging mode at a time of acquiring a radiographic image by the radiation detection unit from a control apparatus;
   a storage unit configured to store correction data for correcting the radiographic image; and
   a control unit configured to control an operation of at least one of the radiation detection unit, the communication unit, and the storage unit,
   wherein, in a case where imaging is started in a normal imaging state in which communication between the communication unit and the control apparatus is in a normal state, the control unit acquires first correction data by a first preparation operation of driving the radiation detection unit in a non-irradiation state in the imaging mode received by the communication unit, and in a case where imaging is started in an emergency imaging state in which the communication state is not in the normal state, the control unit acquires second correction data that is usable in an abnormal imaging mode set in advance from the storage unit.

2. The radiation imaging apparatus according to claim 1, wherein the storage unit includes a first storage unit and a second storage unit, the first correction data is stored in the first storage unit, and the second correction data is stored in the second storage unit.

3. The radiation imaging apparatus according to claim 2, wherein the first storage unit includes a volatile memory, and the second storage unit includes a nonvolatile memory.

4. The radiation imaging apparatus according to claim 1, wherein the second correction data is correction data acquired by a second preparation operation of driving the radiation detection unit in the non-irradiation state in the abnormal imaging mode.

5. The radiation imaging apparatus according to claim 4, wherein the second correction data includes at least one of date and time information and temperature information at the time of performing the second preparation operation.

6. The radiation imaging apparatus according to claim 5, wherein the second correction data includes the date and time information, the control unit acquires the second correction data stored in the second storage unit in a case where a predetermined time has not elapsed since acquisition of the second correction data, and the control unit performs the second preparation operation to update and store the second correction data in the second storage unit and then acquires the second correction data from the second storage unit in a case where the predetermined time has elapsed.

7. The radiation imaging apparatus according to claim 5, wherein the second correction data includes the temperature information, the control unit acquires the second correction data stored in the second storage unit in a case where a predetermined temperature change does not occur since acquisition of the second correction data, and the control unit performs the second preparation operation to update and store the second correction data in the second storage unit and then acquires the second correction data from the second storage unit in a case where the predetermined temperature change occurs.

* * * * *